United States Patent Office 3,511,870
Patented May 12, 1970

3,511,870
POLYHALOGENATED BICYCLIC URETHANES
Paul E. Hoch, Moraga, Calif., assignor to Hooker Chemical Corporation, Niagara Falls, N.Y., a corporation of New York
No Drawing. Continuation-in-part of application Ser. No. 368,702, May 19, 1964. This application May 19, 1967, Ser. No. 639,658
Int. Cl. C07c 101/26
U.S. Cl. 260—468   7 Claims

ABSTRACT OF THE DISCLOSURE

Compounds of the formula

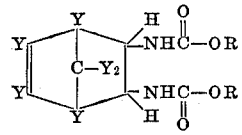

wherein Y is fluorine, chlorine, bromine or mixtures there and R is alkyl, aryl, substituted alkyl or substituted aryl are useful in agricultural applications and in the preparation of polymeric materials.

CROSS-REFERENCE TO PRIOR APPLICATIONS

This is a continuation-in-part of copending application Ser. No. 368,702, filed May 19, 1964, now abandoned, a continuation-in-part of application Ser. No. 220,024, filed Aug. 28, 1962, now U.S. Pat. 3,158,638, which is a continuation-in-part of application Ser. No. 838,046, filed Sept. 4, 1959, now U.S. Pat. 3,151,143.

This invention relates to compositions of matter known as polyhalogen containing bicyclic urethanes, wherein the halogen is selected from the group consisting of chlorine, bromine, fluorine, and mixtures thereof.

The compositions of the present invention find utility in many applications, for example, in agricultural applications and in the preparation of polymeric materials which are flame retardant. The urethanes can be esterinterchanged with polyesters by heating in the presence of acid catalyst to cause incorporation of the bicyclic halogenated nucleus into the polyester molecule thereby rendering the same fire-resistant. The urethanes can also be incorporated as additives in polymeric compositions such as the polyurethanes to render them fire resistant.

The compounds of the invention are represented by the following general formula:

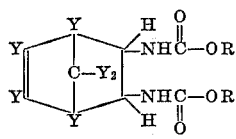

wherein Y can be fluorine, chlorine, bromine, or mixtures thereof, and R represents alkyl, aryl, substituted alkyl or substituted aryl as will be pointetd out with greater particularity hereinafter.

The polyhalogenated, bicyclic urethanes can be prepared from the corresponding polyhalogenated, bicyclic diisocyanates. The latter compounds are prepared by reacting a polyhalogenated, bicyclic acid chloride, for example, 3,4,5,6,7,7 - hexachloro-3,6-methano-1,2,3,6-tetrahydrophthaloyl chloride, with at least two moles of an alkali metal azide to form a diazide, which upon heating forms desired diisocyanate, for example, 3,4,5, 6,7,7 - hexachloro - 3,6-endomethylene-1,2,3,6-tetrahydrobenzene-1,2-diisocyanate. Any alkali metal azide can be employed, for example, sodium, potassium, cesium, lithium, etc. The organic diazide can be decomposed at temperatures in the range of about 60 to about 90 degrees centigrade. The starting material can also be fluoro- or bromo- substituted. Alternatively mixed chloro-, fluoro-, or bromo- substituted compounds can be employed. Useful materials can also be obtained by substituting some of the halogens with alkoxy groups. The following are additional examples of the diisocyanate starting materials that can be used in preparing the urethanes of the invention: 3,4,5,6,7,7-hexabromo-3,6-endomethylene - 1,2,3,6 - tetrahydrobenzene - 1,2 - diisocyanate, 3,4,5,6 - tetrachloro - 7,7 - difluoro-3,6-endomethylene - 1,2,3,6 - tetrahydrobenzene-1,2-diisocyanate, 3,4,5,6-tetrachloro-7,7 - dibromo - 3,6 - endomethylene-1,2,3,6-tetrahydrobenzene - 1,2 - diisocyanate, 3,4,5,6,7 - pentachloro - 3,6 - endomethylene - 1,2,3,6 - tetrahydrobenzene - 1,2 - diisocyanate, 3,4,5,6 - tetrachloro - 3,6 - endomethylene - 1,2,3,6 - tetrahydrobenzene - 1,2-diisocyanate, and 3,4,5,6 - tetrachloro - 7,7 - dimethoxy - 3,6 - endomethylene - 1,2,3,6 - tetrahydrobenzene-1,2-diisocyanate.

The urethanes of the invention can be prepared from the thus described diisocyanates in accordance with the following equation given for the purpose of illustration.

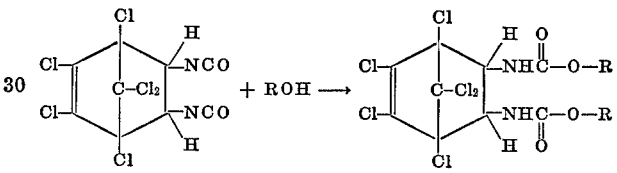

wherein R can be aliphatic or aromatic. Typical alkyl and chloro-substituted alkyl compounds are methyl alcohol, ethyl alcohol, butyl alcohol, nonyl alcohol, dodecyl alcohol, cetyl alcohol, eicosyl alcohol, 2-chloroethanol - 1, 2,2,2-trichloroethanol-1, 1-chloropropanol-2, 3, chloro - 2 - methyl-propanol-1, 2,2,3-trichlorobutanol-1, 6-chlorohexanol-1, 8-chlorooctanol-1, 12-chlorododecanol-1, 1,1,3,3-tetrachloropropanol-2, 1,1 - dichloro - 2-methyl - propanol - 2, 1,1,1-trichlorobutanol-2, and the like. Generally, the alkyl groups have one to twenty carbon atoms, preferably one to twelve. Typical aryl and chloro-substituted aryl compounds are phenol, cresol, 3,5-diisopropyl phenol, naphthol, hydroxyanthracene, hydroxybenzanthracene, hydroxydibenzanthracene, parachlorophenol, ortho-chlorophenol, 2,4-dichlorophenol, 3,4-dichlorophenol, 2,4,6-trichlorophenol, 2,3,5,6-tetrachlorophenol, pentachlorophenol, 3 - chloro-2 - methylphenol, 4,6-dichloro - 2 - methylphenol, 3-chloro-ortho-4-xylenol, 5-chloro-para-2-xylenol, trichloro-para-xylenol, 2-chloro- 4-n-butylphenol, 2 - chloronaphthol-1, 2,4-dichloro-naphthol-1, 5,8 - dichloronaphthol-1, 1,4-dichloronaphthol-2, 3-chloro-4-hydroxyl-biphenyl, and the like. Generally, the aryl groups have six to twenty carbon atoms, preferably six to fourteen.

The reaction proceeds by admixing the desired reactants in the presence of a suitable solvent, which can be in excess of the desired alcohol reactant or an inert diluent, such as ether. Since the reaction is exothermic, the reaction mixture is cooled, for example, by refluxing. The product is recovered by phase separation, e.g., filtration, decantation, evaporation of the solvent, and the like; and further by solvent washing and recrystallization, if desired.

The following examples further illustrate the invention, but are not intended to limit it. All parts are by weight and temperatures in degrees centigrade unless indicated otherwise.

EXAMPLE 1

Preparation of 3,4,5,6,7,7-hexachloro-3,6-endomethylene-1,2,3,6-tetrahydrobenzene-1,2,-diisocyanate A suspension of 180 cubic centimeters dry chlorobenzene and 12.7 grams (0.196 mole) of sodium azide (activated previously with hydrazine and reprecipitated in acetone before use) was treated with 38 grams (0.089 mole) of 3,4,5,6,7,7 - hexachloro - 3,6 - methano-1,2,3,6-tetrahydrophthaloyl chloride. The suspension developed an exotherm and the temperature rose from 28 to 40 degrees centigrade in 15 minutes. Heat was then applied and the temperature was raised to 71 degrees centigrade at which point gas evolution was observed and a second exotherm took place. The temperature rose to 86 degrees centigrade and cooling was employed. The suspension was maintained at a temperature of from about 64 to 77 degrees centigrade for 35 minutes, bringing the total reaction time to 2 hours and 40 minutes. The suspension was cooled to 25 degrees centigrade and filtered. The filtrate was evaporated under vacuum on a steam cone. The residue, weighing thirty grams, was the expected product.

*Analysis.*—Calculated for $C_9H_2Cl_6N_2O_2$ (percent): Cl, 55.6. Found (percent): 55.49.

EXAMPLE 2

Preparation of a urethane derivative 3,4,5,6,7,7-hexachloro - 3,6 - endomethylene - 1,2,3,6 - tetrahydrobenzene-1,2-bis-(butyl carbamate)

A solution of 3.5 grams of the product of Example 1 and 25 milliliters of N-butyl alcohol was refluxed for 10 minutes. The solution resulting was cooled and a micro crystalline solid separated. This material was recrystallized twice from ethanol to yield 1 gram of 3,4,5,6,7,7 - hexachloro - 3,6 - endomethylene - 1,2,3,6 - tetrahydrobenzene - 1,2 - bis - (butyl carbamate), which had a melting point of 163 to 163.5 degrees centigrade.

*Analysis.*—Calculated for $C_{17}H_{22}Cl_6O_4N_2$ (percent): Cl, 40.2. Found (percent): Cl, 40.1.

EXAMPLE 3

Preparation of urethane derivative 3,4,5,6,7,7-hexabromo-3,6 - endomethylene - 1,2,3,6 - tetrahydrobenzene-1,2-bis-(phenyl carbamate)

Using the same method as that employed in Example 2, 25 milliliters of phenol are reacted with 4 grams of 3,4,5,6,7,7 - hexabromo - 3,6 - endomethylene - 1,2,3,6-tetrahydrobenzene - 1,2 - diisocyanate to produce 3,4,5,6,7,7 - hexabromo - 3,6 - endomethylene - 1,2,3,6-tetrahydrobenzene-1,2-bis-(phenyl carbamate).

EXAMPLE 4

Preparation of a urethane derivative, 3,4,5,6,7,7-hexachloro-3,6-endomethylene - 1,2,3,6-tetrahydrobenzene-1,2-bis-(ethyl carbamate)

A solution of 4 grams of the product of Example 1 and 25 cubic centimeters of ethanol were stirred. The reaction was mildly exothermic. After 10 minutes the excess alcohol was evaporated and the resulting solid was recrystallized several times from nitromethane to yield 1.5 grams of 3,4,5,6,7,7 - hexachloro-3,6-endomethylene-1,2,3,6-tetrahydrobenzene-1,2-bis(ethyl carbamate). The melting point was 215 to 216 degrees centigrade with sublimation.

*Analysis.*—Calculated for $C_{13}H_{14}Cl_6N_2O_4$ (percent): Cl, 44.8. Found (percent): Cl. 44.4.

EXAMPLE 5

Preparation of a urethane derivative 3,4,5,6 - tetrachloro-7,7 - difluoro - 3,6-endomethylene-1,2,3,6-tetrahydrobenzene-1,2-bis-(2'-chloroethyl carbamate)

Using the method employed in Example 4, 25 milliliters of 2-chloroethanol are reacted with 5 grams of 3,4,5,6-tetrachloro - 7,7 - difluoro - 3,6 - endomethylene-1,2,3,6 - tetrahydrobenzene - 1,2 - diisocyanate to produce 3,4,5,6 - tetrachloro - 7,7 - difluoro-3,6-endomethylene-1,2,3,6 - tetrahydrobenzene - 1,2 - bis - (2'-chloroethyl carbamate).

This invention can be embodied in other forms or carried out in other ways without departing from the spirit or essential characteristics thereof. The present embodiment is therefore to be considered as in all respects illustrative and not restrictive.

I claim:

1. A compound having the formula

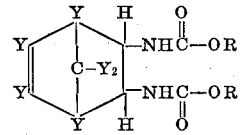

wherein Y is selected from the group consisting of fluorine, chlorine, bromine and mixtures thereof; and R is selected from the groups consisting of alkyl of 1 to 20 carbon atoms, aryl of 6 to 20 carbon atoms, chloro-substituted alkyl of 1 to 12 carbon atoms and chloro-substituted aryl of 6 to 14 carbon atoms.

2. A compound according to claim 1 wherein Y is chlorine and R is alkyl of 1 to 12 carbon atoms.

3. A compound according to claim 1 wherein Y is chlorine and R is aryl of 6 to 14 carbon atoms.

4. A compound according to claim 1 wherein Y is chlorine and R is chloroethyl.

5. A compound according to claim 1 wherein Y is chlorine and R is chlorophenyl.

6. The compound according to claim 2 which is 3,4,5,6,7,7 - hexachloro - 3,6 - endomethylene - 1,2,3,6-tetrahydrobenzene - 1,2 - bis - (ethyl carbamate).

7. The compound according to claim 2 which is 3,4,5,6,7,7 - hexachloro - 3,6 - endomethylene - 1,2,3,6-tetrahydrobenzene - 1,2 - bis - (butyl carbamate).

References Cited

UNITED STATES PATENTS 2,841,485  7/1958  Johnson _____ 71—2.3

LORRAINE A. WEINBERGER, Primary Examiner

P. J. KILLOS, Assistant Examiner

U.S. Cl. X.R.

252—8.1